United States Patent
Bauch et al.

(10) Patent No.: US 12,436,265 B2
(45) Date of Patent: Oct. 7, 2025

(54) METHOD AND APPARATUS FOR SENSOR DATA FUSION FOR A VEHICLE

(71) Applicant: Bayerische Motoren Werke Aktiengesellschaft, Munich (DE)

(72) Inventors: Dominik Bauch, Muehldorf am Inn (DE); Marco Baumgartl, Gilching (DE); Michael Himmelsbach, Munich (DE); Josef Mehringer, Gmund (DE); Daniel Meissner, Friedberg (DE); Luca Trentinaglia, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 771 days.

(21) Appl. No.: 17/417,386

(22) PCT Filed: Oct. 25, 2019

(86) PCT No.: PCT/EP2019/079225
§ 371 (c)(1),
(2) Date: Jun. 23, 2021

(87) PCT Pub. No.: WO2020/160798
PCT Pub. Date: Aug. 13, 2020

(65) Prior Publication Data
US 2022/0075053 A1    Mar. 10, 2022

(30) Foreign Application Priority Data
Feb. 6, 2019 (DE) .......................... 102019102923.6

(51) Int. Cl.
*G01S 13/86*    (2006.01)
*G01S 13/931*    (2020.01)

(52) U.S. Cl.
CPC .......... *G01S 13/862* (2013.01); *G01S 13/865* (2013.01); *G01S 13/867* (2013.01); *G01S 13/931* (2013.01);
(Continued)

(58) Field of Classification Search
CPC .... G01S 13/862; G01S 13/865; G01S 13/867; G01S 13/931; G01S 2013/9323; G01S 2013/9324
See application file for complete search history.

(56) References Cited

U.S. PATENT DOCUMENTS

| | | | | |
|---|---|---|---|---|
| 2007/0182623 A1* | 8/2007 | Zeng | ...................... | G01S 13/862 342/174 |
| 2016/0054442 A1* | 2/2016 | Li | .......................... | G01S 13/87 342/107 |

(Continued)

FOREIGN PATENT DOCUMENTS

| | | |
|---|---|---|
| CN | 105109484 A | 12/2015 |
| CN | 109086788 A | 12/2018 |

(Continued)

*Primary Examiner* — Alexander Satanovsky
(74) *Attorney, Agent, or Firm* — Kieran O'Leary; 2SPL Patent Attorneys PartG mbB

(57) ABSTRACT

A method and apparatus for sensor data fusion for a vehicle as well as a vehicle, a computer program, and a computer-readable storage medium are disclosed. A distance sensor (S1) is associated with the vehicle (F), and wherein in the method: fusion object data is provided which is representative of a fusion object ($O_F$) determined in the vicinity of the vehicle (F); a directional characteristic value is determined which is representative of an angle ($\alpha$) of the measurement direction (M) of the distance sensor (S1); a distance measurement value (d) of the distance sensor (S1) is detected; depending on the distance measurement value (d) and the directional characteristic value, a fusion object ($O_F$) is determined to which the distance measurement value (d) and (Continued)

the directional characteristic value are assigned, and an innovated fusion object is determined depending on the distance measurement value (d), the directional characteristic value and the fusion object data.

15 Claims, 2 Drawing Sheets

(52) U.S. Cl.
CPC ............... *G01S 2013/9323* (2020.01); *G01S 2013/9324* (2020.01)

(56) References Cited

U.S. PATENT DOCUMENTS

| | | | | |
|---|---|---|---|---|
| 2018/0356505 | A1* | 12/2018 | Miyata | G01S 13/878 |
| 2018/0367871 | A1* | 12/2018 | Zeng | G01S 13/931 |

FOREIGN PATENT DOCUMENTS

| | | | |
|---|---|---|---|
| DE | 10235414 | A1 | 2/2004 |
| DE | 10319700 | A1 | 11/2004 |
| DE | 102007005121 | A1 | 9/2007 |
| DE | 102010002105 | A1 | 8/2011 |
| DE | 102010063133 | A1 | 6/2012 |
| DE | 102014223363 | A1 | 5/2016 |
| DE | 102015214743 | A1 | 2/2017 |
| DE | 102017101772 | A1 | 9/2018 |
| DE | 102018114042 | A1 | 12/2018 |

\* cited by examiner

Fig. 1
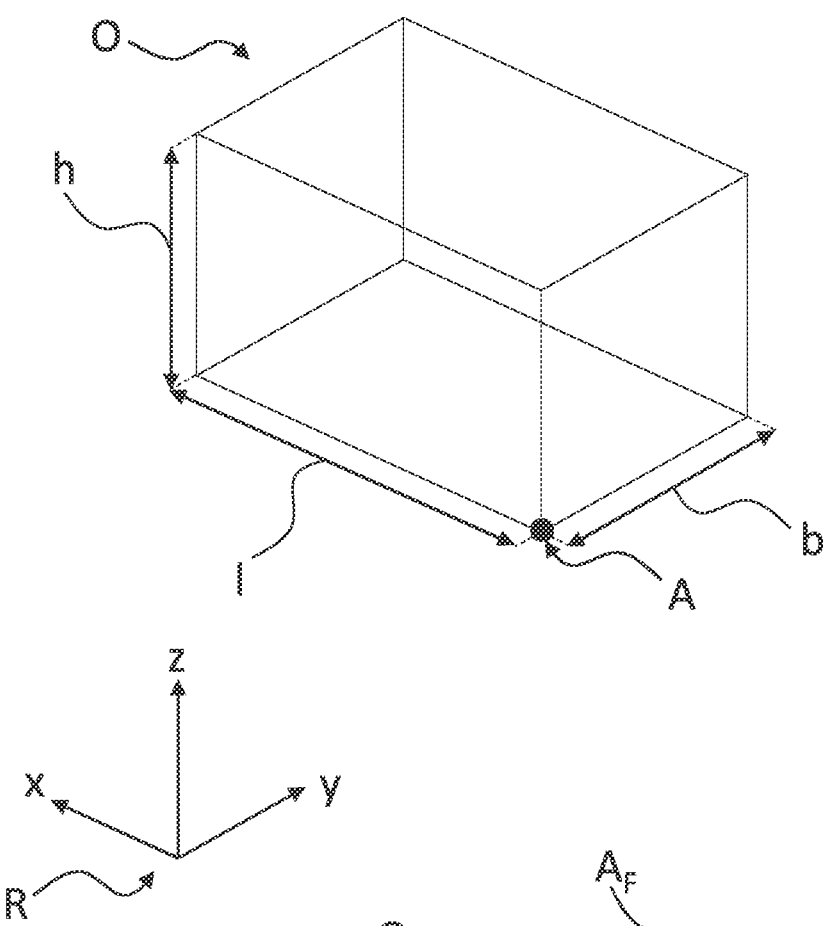
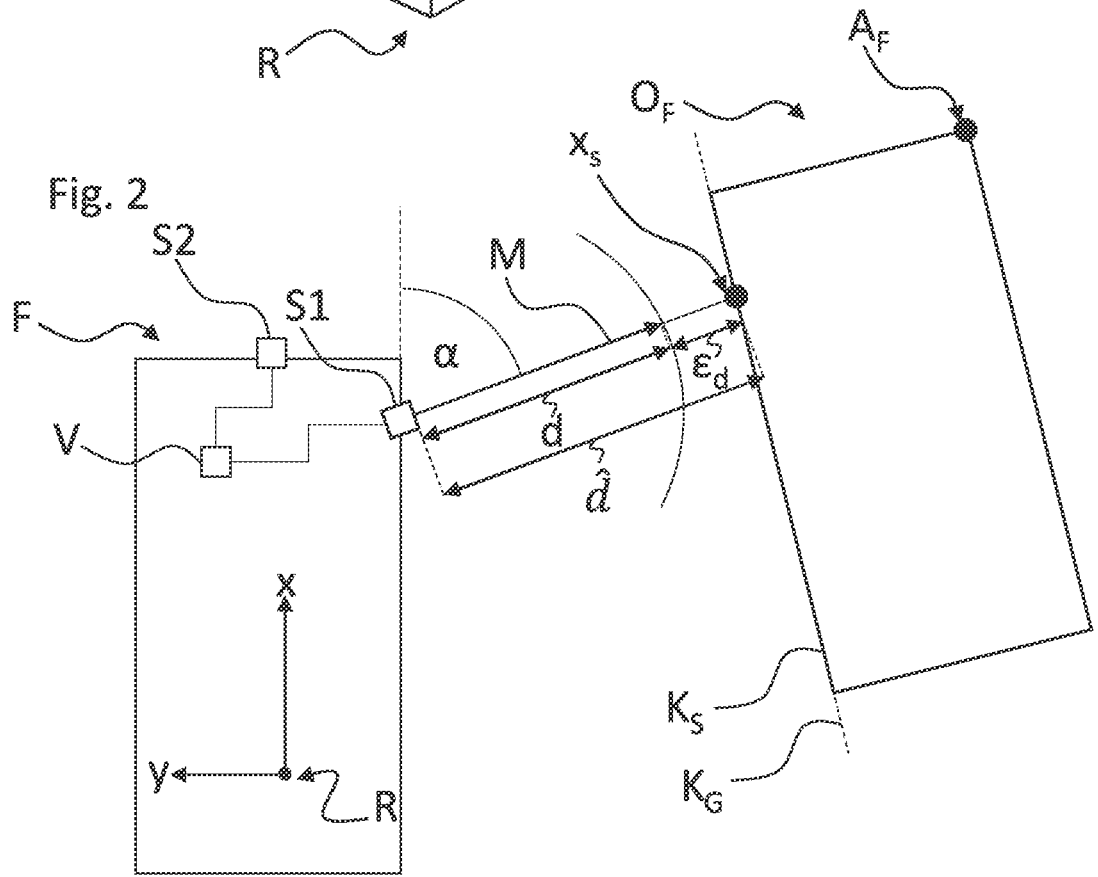
Fig. 2

METHOD AND APPARATUS FOR SENSOR DATA FUSION FOR A VEHICLE

CROSS-REFERENCE TO RELATED APPLICATIONS

This application is a 35 U.S.C. § 371(c) national stage entry of PCT/EP2019/079225, filed on Oct. 25, 2019. That application claimed priority to German Application 10 2019 102 923.6 filed on Feb. 6, 2019. The contents of the earlier filed applications are incorporated by reference herein in their entirety.

FIELD

The invention relates to a method and apparatus for sensor data fusion for a vehicle. In addition, the invention relates to a vehicle, a computer program, and a computer-readable storage medium.

BACKGROUND

Heterogeneous sensor devices are often used to detect objects in the vicinity of a vehicle. Detected objects in the vehicle environment may be used for the safe implementation of assistance functions, in particular for longitudinal control functions such as Active Cruise Control, or an intersection assistant, and for lateral control functions such as Lateral Collision Avoidance, Steering and Lane Control Assistant.

Due to different measuring principles of the sensor devices used, the information about the objects detected by the sensor devices may be different. Due to limited computing power in vehicles, the information provided by the sensor devices is usually fused at a high-level. This means that the sensor devices each separately recognize objects on the basis of the sensed information and provide the same as information in an abstract, sensor-independent object representation (so-called "sensor objects"); the information provided is then merged and/or fused by a separate sensor data fusion unit each into a respective object representation for each actual object (so-called "fusion objects").

For example, a rectangle or cuboid may be used as an object representation (cf. FIG. 1). For this object representation, each object O is assigned a reference point A which comprises, with respect to a reference coordinate system R, for example relative to a predetermined reference point on/in the vehicle, a lateral displacement (x, y), an orientation of the object O, for example the angle to the x-axis of the reference coordinate system R, as well as the length l (with respect to the x-axis) and width b (with respect to the y-axis). A reference point A, to which a width b, length l and orientation are assigned in addition to the lateral displacement (x, y) as the position of the object O, may also be called a "state". Further properties of the object O may be assigned to the state, for example the height h (with respect to the z-axis), velocity or an object type. Each measured quantity of the object O may be modeled as a normally distributed random variable with variance and covariances with respect to the other measured quantities and these values may also be assigned to the state.

In high-level fusion, therefore, only the provided object representations of the individual sensor devices are fused, i.e., in particular, sensor objects are associated and fused to form fusion objects; the sensor-specific information acquired about the objects is processed by the sensor devices themselves and is disregarded by the sensor data fusion unit. This distributes the computational load across sensor devices and sensor data fusion unit; instead of sensor-specific data processing or communication, object representations may be used.

A disadvantage is that information about the objects is lost due to the pre-processing of the detected information by the sensor devices and the associated abstraction. Another disadvantage is that some sensor data, which do not meet the requirements of the object representation used, cannot be used for the above-mentioned high-level fusion. In particular, this concerns comparatively inexpensive sensor devices, such as distance sensors, in which individual measured quantities of the object representation used may not be measured.

The task underlying the invention is to provide a method for sensor data fusion for a vehicle as well as a corresponding device, a vehicle, computer program as well as computer-readable storage medium, by means of which the aforementioned disadvantages may be overcome.

SUMMARY

The task is solved by the independent patent claims. Advantageous implementations are indicated in the sub-claims.

According to a first aspect, the invention relates to a method of sensor data fusion for a vehicle having a distance sensor associated therewith. In the method, a fusion object data set comprising fusion object data is provided. The fusion object data is each representative of a fusion object detected in the vicinity of the vehicle.

The method also determines a directional characteristic value. The directional characteristic value is representative of an angle that a measurement direction of the distance sensor makes during intended operation with a predetermined reference axis of a predetermined reference coordinate system of the vehicle.

In addition, a distance measurement value of the distance sensor is detected.

Depending on the distance measurement value and the directional characteristic value, a fusion object is determined to which the distance measurement value and the directional characteristic value are assigned.

Further, an innovated fusion object is determined depending on the distance measurement value, the directional characteristic value and the corresponding fusion object data.

Advantageously, this enables the use of distance sensors for high-level fusion in vehicles.

By fusing object data and distance measurement values, almost all distance sensors may be used, especially comparatively low-cost ultrasonic sensors or radar sensors with low angular resolution and/or, in the case of angular information with high uncertainty.

By using an already existing fusion object data set for the fusion of the distance measurement values, an association of the distance measurement values to detected objects may be implemented in a simplified way, so that an implementation on low-power control devices used in the vehicle is facilitated.

The fusion object data provided is particularly representative of fusion objects in rectangular or cuboid object representation. For example, the longitudinal axis of the vehicle may be considered as a predetermined reference axis.

The step in which a fusion object is determined from the fusion object data set for association depending on the distance measurement value and the directional characteristic value may also be referred to as the association step.

The step of determining an innovated fusion object depending on the distance measurement value, the directional characteristic value, and the fusion object data corresponding to the fusion object assigned in the association step may also be referred to as the innovation step or fusion.

In an advantageous embodiment according to the first aspect, a distance characteristic value is determined each depending on the object data. The distance characteristic value is representative of a distance in the measuring direction between the distance sensor and one fusion object each detected in the vicinity of the vehicle.

Furthermore, a deviation each between the respective distance characteristic value and the distance measurement value is determined. Only in the case that the deviation is smaller than a given threshold value, the distance measurement value and the directional characteristic value are assigned to a fusion object. Otherwise, the corresponding distance measurement value and/or directional characteristic value is, for example, discarded or checked whether the distance measurement value has a smaller deviation from a distance characteristic value assigned to another fusion object from the fusion object data set.

Advantageously, this enables data reduction so that a computational load may be kept low during processing. This step may also be referred to as gating. The distance characteristic value does not represent an actual measurement value, but rather corresponds to a prediction based on the already existing fusion object data set, which distance measurement value the distance sensor will probably output for each fusion object. As a measure of the deviation, the Euclidean distance or Mahalanobis distance may be used as an example.

In a further advantageous embodiment according to the first aspect, the distance measurement value is exclusively assigned to the fusion object with the lowest determined deviation. For example, several potential fusion objects are first identified as candidates for allocation whose respective deviation falls below the threshold value. In a second step, the fusion object with the smallest deviation may be determined from the candidates by means of a so-called local nearest neighbor gating method.

In a further advantageous embodiment according to the first aspect, a respective contour segment of the corresponding fusion object facing the vehicle is determined depending on the fusion object data.

In addition, starting from the distance sensor, an intersection point each between a vector in the measuring direction and a straight line along the respective contour segment is determined.

Finally, the respective distance characteristic value is determined depending on the respective intersection point.

In an advantageous way, a variance of the measured quantities of length and width of the object may be taken into account.

In a further advantageous embodiment according to the first aspect, the fusion object data comprises a fusion reference point, a lateral extent of the fusion object with respect to the fusion reference point, an orientation of the fusion object with respect to the reference coordinate system of the vehicle, and each an indicator characteristic value representative of an uncertainty in the determination of the lateral extent and orientation.

Depending on the fusion object data and the intersection point, a transformation state is then determined. The transformation state includes a lateral extent of the fusion object with respect to the intersection point, the orientation of the fusion object with respect to the reference coordinate system of the vehicle, and an indicator characteristic value each representative of an uncertainty in the determination of the lateral extent and orientation.

The fusion reference point may also be referred to as the state of the fusion object. Advantageously, this embodiment allows the state of the fusion object to be transformed to the determined intersection point, taking into account the uncertainties.

In a further advantageous embodiment according to the first aspect, an innovated transformation state is determined depending on the transformation state and the indicator characteristic values, the distance measurement value and the directional characteristic value.

Thereupon an innovated fusion object is determined, depending on the innovated transformation state.

The innovated transformation state denotes a transformation state supplemented by the measurement data of the distance sensor. Advantageously, the state of the fusion object at the determined intersection point may thus be adjusted with the determined distance measurement value and the directional characteristic value, taking into account the uncertainties. The step of determining an innovated fusion object depending on the innovated transformation state comprises, in particular, transforming back to the original fusion reference point so as to subsequently enable fusion of the innovated fusion object with sensor objects again.

In a further advantageous embodiment according to the first aspect, the measurement direction of the distance sensor is determined depending on a detection characteristic of the distance sensor, in particular in the case that the distance sensor is an ultrasonic sensor. Alternatively, the measuring direction may be predetermined, for example, by an installation of the distance sensor and may be stored, for example, by a factory calibration in the sensor data fusion unit.

According to a second aspect, the invention relates to a sensor data fusion device for a vehicle. The device is configured to perform a method according to the first aspect. The device may also be referred to as a sensor data fusion unit.

According to a third aspect, the invention relates to a vehicle. The vehicle comprises a sensor data fusion device according to the second aspect, and a distance sensor.

In an advantageous embodiment according to the third aspect, the vehicle comprises a further sensor device. The further sensor device is configured to detect measurement data representative of an environment of the vehicle.

Furthermore, the further sensor device is configured to determine, depending on the measurement data, sensor object data representative of a sensor object detected in the vicinity of the vehicle by the further sensor device.

Further, the device is configured to determine an innovated fusion object depending on the fusion object data set and the sensor object data. The innovated fusion object is exemplarily represented by fusion object data stored in the fusion object data set.

In a further advantageous embodiment according to the third aspect, the further sensor device comprises or consists of at least one of a camera, a RaDAR, Radio Detection And Ranging, sensor, a LiDAR, Light Detection And Ranging, sensor or a LaDAR, Laser Detection And Ranging, sensor.

In a further advantageous embodiment according to the third aspect, the distance sensor comprises or consists of at least one of an ultrasonic sensor, a point laser sensor, an infrared sensor, or a RaDAR, Radio Detection And Ranging, sensor.

According to a fourth aspect, the invention relates to a computer program for sensor data fusion for a vehicle. The computer program includes instructions that, when the program is executed by a computer, cause the computer to perform the method according to the first aspect.

According to a fifth aspect, the invention relates to a computer-readable storage medium on which the computer program according to the fourth aspect is stored.

BRIEF DESCRIPTION OF THE FIGURES

Embodiments of the invention are explained in more detail below with reference to the schematic drawings, in which:

FIG. 1 shows an exemplary object representation;

FIG. 2 shows an embodiment of a vehicle according to the invention with a device for sensor data fusion.

DETAILED DESCRIPTION

Figure 3:
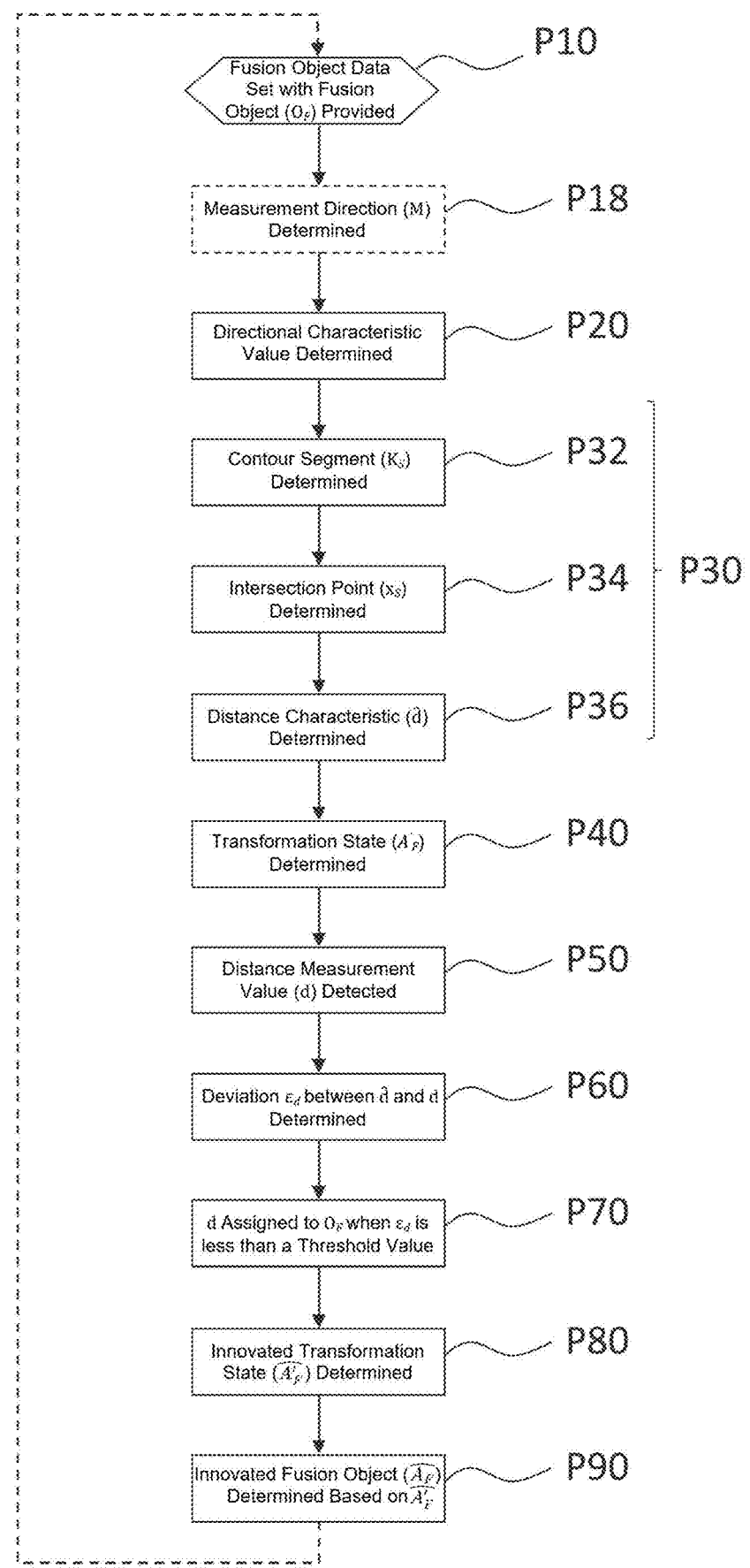
FIG. 3 shows an exemplary flow chart of a sensor data fusion method.

Elements of the same construction or function are provided with the same reference numerals across all Figures.

In the following, a system is proposed that allows distance measurements to be fused in a high-level object fusion. With reference to the embodiment of FIG. 2, a vehicle F according to the invention is shown with a device V for sensor data fusion as well as a distance sensor S1, which is configured to detect distance measurement values d. This may be, for example, an ultrasonic, point laser or infrared sensor. Regardless of the method used for high-level object fusion, in the automotive field as a result of object fusion usually a list of rectangles and/or cuboids (cf. FIG. 1) is output as an object representation, which represent detected, in particular moving, objects in the environment of the vehicle F. FIG. 2 shows such a fusion object $O_F$, which is assigned a fusion reference point $A_F$, a length l and width b with respect to the fusion reference point A, an orientation of the fusion object $O_F$ with respect to a reference coordinate system R of the vehicle F, and an indicator characteristic value each which is representative of an uncertainty in the determination of the length l, width b and orientation. The uncertainty may be expressed, for example, by a variance.

In addition to the distance measurement value d, a measurement direction α in which the distance measurement value d was detected may be determined by the orientation of the distance sensor S1 or, in the case of an ultrasonic sensor, for example, from the detection characteristic. In addition, associated variances may be determined during the measurement.

The vehicle F further comprises, by way of example, a further sensor device S2 configured to detect the environment of the vehicle F. The distance sensor S1 and the further sensor device S2 are signal-coupled to the sensor data fusion device V. In this regard, the further sensor device S2 provides sensor object data that is fused by the device V according to any high-level object fusion method and stored in a fusion object data set. Exemplarily reference is made in this context to the remarks of N. Kämpchen in "Feature-level fusion of laser scanner and video data", Ulm: Ulm University, 2007; and F. Seeliger in "Fahrzeugübergreifende Informationsfusion," Ulm: Schriftenreihe des Instituts für Mess-, Regel-und Mikrotechnik der Universität Ulm, 2017.

In order to fuse the distance measurement values d with the fusion object data, according to the inventive method, these are associated as follows with a respective fusion object $O_F$ each and the object state is subsequently innovated. In the association step, the distance measurement of the distance sensor S1 is associated with a fusion object $O_F$ from the fused object list and/or from the fusion object data set. If the vehicle F comprises more than one distance sensor S1, the steps described below shall be applied accordingly for each of these distance sensors per measurement. In the innovation, the state of each fusion object $O_F$ is adjusted with the associated distance data.

In this context, the device V is associated in particular with a data and program memory in which a computer program is stored, which is explained in more detail below with reference to the flow chart in FIG. 3.

In a first step P10, a fusion object data set comprising fusion object data each representative of a fusion object $O_F$ detected in the vicinity of the vehicle F is provided. For example, the fusion object data set is stored in a data memory of the device V and was determined from the sensor object data of the further sensor device S2 in a previous fusion process.

The program continues in a step P20 in which a directional characteristic value representative of an angle α included by a measurement direction M of the distance sensor S1 in intended operation with a predetermined reference axis x of the vehicle F is determined.

In this regard, in a preceding step P18, the measurement direction M of the distance sensor S1 may have been determined depending on its detection characteristic.

In a step P30 following the step P20, a distance characteristic value $\hat{d}$ is determined each depending on the object data which is representative of a distance in the measurement direction M between the distance sensor S1 and one fusion object $O_F$ each determined in the vicinity of the vehicle F.

For this purpose, in a step P32, a respective contour segment $K_S$ of the corresponding fusion object $O_F$ facing the vehicle F each is determined depending on the fusion object data, and in a subsequent step P34, based on the distance sensor S1, a respective intersection point $x_S$ between a vector in the measurement direction M and a straight line $K_G$ through the respective contour segment $K_S$ is determined. The intersection point $x_S$ is determined in particular in a lateral direction, i.e., as an offset with respect to the reference coordinate system R along the x and y axes. In other words, the intersection point $x_S$ of the directional vector of the distance measurement with the nearest contour segment $K_S$ of each fusion object $O_F$ is determined. Depending on the variance of the object extent (length l and width b), there may also be intersection points $x_S$ which lie on the respective extensions $K_G$ of the contour segments $K_S$, slightly off next to the fusion object $O_F$. The respective distance characteristic value $\hat{d}$ is then determined in a step P36 depending on the respective intersection point $x_S$.

Subsequently, in a step P40, depending on the fusion object data and the intersection point $x_S$, a transformation state is determined which comprises the length and width of the fusion object $O_F$ with respect to the intersection point $x_S$, the orientation of the fusion object $O_F$ with respect to the reference coordinate system R, and a corresponding indicator characteristic value each, in order to thus transform the state of the fusion object $O_F$ to the determined intersection point $x_S$, taking into account the uncertainties. The object state and/or the fusion reference point $A_F$ is transformed from the current fusion reference point $A_F$ on the object contour $K_S$ to the intersection point $x_S$ using the function $A'_F=f(A_F)$, where $A'_F$ denotes the transformation state. Accordingly, the variances $P_{A_F}$ of the object state are transformed into the intersection point $x_S$ by means of $P'_{A_F}=J_f(A_F) \cdot P_{A_F} \cdot J_f(A_F)^T$, wherein $J_f(A_F)$ is the Jacobian matrix of $f(\bullet)$ at point $A_F$.

In a subsequent step P50, a distance measurement value d of the distance sensor S1 is detected. Subsequently, in a step P60, a respective deviation $\varepsilon_d$ between the distance characteristic value $\hat{d}$ and the respective distance measurement value d is determined, wherein only in the case that the deviation $\varepsilon_d$ is smaller than a predetermined threshold value is the distance measurement value d assigned to a fusion object $O_F$ in a subsequent step P70, and exclusively to the fusion object $O_F$ with the smallest determined deviation $\varepsilon_d$. The step P60 may also be referred to as gating. In other words, only if the difference between the predicted distance of the distance sensor S1 to the intersection point $x_S$ and the actual measured distance is smaller than a threshold value that may be applied depending on the application, is the fusion object $O_F$ considered as a candidate for association. Any criteria may be used as a measure of the difference, such as the Euclidean distance, Mahalanobi's distance, and so on. Of all the fusion objects $O_F$ determined to be candidates for association, the distance measurement is associated to the fusion object $O_F$ with the smallest difference. Here, each distance measurement is associated with only one fusion object $O_F$. However, multiple distance measurements may be associated with a fusion object $O_F$.

In a step P80 following the step P70, an innovated transformation state is determined depending on the transformation state and the indicator characteristic values, the distance measurement value d and the directional characteristic value.

In this case, the transformation state $A'_F$ is adjusted with respect to the intersection point $x_S$ with the distance data associated in step P70. In particular, the following model may be used for this purpose for the measurement, using which, for each state, with the coordinates (X, Y) the expected measurement $\hat{z}=(\hat{d}, \hat{\alpha})$ may be calculated:

$$\hat{d} = \sqrt{X^2 + Y^2} \quad (1)$$

$$\hat{\alpha} = 2\tan^{-1}\left(\frac{Y}{X+\hat{d}}\right) \quad (2)$$

$$R = \begin{bmatrix} \text{var}_d & 0 \\ 0 & \text{var}_\alpha \end{bmatrix} \quad (3)$$

Using formulas (1) and (2) of the model, and considering formula (3), which reflect the uncertainty of the distance measurement as variance $\text{var}_d$ and the directional measurement as $\text{var}_\alpha$, with common fusion approaches, as exemplified in F. Seeliger in "Fahrzeugübergreifende Informationsfusion", Ulm: Schriftenreihe des Instituts für Mess-, Regel- und Mikrotechnik der Universität Ulm, 2017, the expected measurement $\hat{z}$ for the transformation state $A'_F$ is determined may be determined and $A'_F$ may be adjusted at the intersection point $x_S$ according to the difference between the expected and actual measurement of the distance sensor S1, i.e., the innovated transformation state $\widehat{A'_F}$ may be determined.

In a subsequent step P90, depending on the innovated transformation state $\widehat{A'_F}$ an innovated fusion object $\widehat{A_F}$ is determined in order to be able to fuse (sensor) object data again in subsequent steps. For this purpose, the innovated transformation state $\widehat{A'_F}$ is for example transformed back by means of $f^{-1}(\bullet)$ and $J_{f^{-1}}(\bullet)$ to the original fusion reference point $A_F$ of the fusion object $O_F$.

If the fusion approach used also estimates the existence probability of the fusion objects $O_F$, the existence probability may also be assigned to the transformation state and be innovated.

The program is then terminated or, if necessary, continued after a predetermined interruption in step P10 with an updated object data set.

The invention claimed is:

1. A method for controlling a vehicle, wherein a sensor data fusion device innovates a fusion object ($O_F$) representing an object in a vicinity of the vehicle, wherein the vehicle comprises a distance sensor as one of a plurality of sensors, wherein the sensor data fusion device is connected to the plurality of sensors, the method comprising:
   obtaining a fusion object data set comprising the fusion object ($O_F$),
      wherein the fusion object data set comprises fusion object data corresponding to the fusion object, and
      wherein the fusion object is a fusion of a plurality of sensor objects each separately detected in the vicinity of the vehicle by one of the plurality of sensors,
   determining an angle ($\alpha$) between a measurement direction (M) of the distance sensor and a predetermined reference axis (x) of a predetermined reference coordinate system (R) of the vehicle,
   determining a contour segment ($K_S$) of the fusion object ($O_F$) facing the vehicle,
   determining, using the distance sensor, an intersection point ($x_S$) between a vector in the measuring direction (M) and a straight line ($K_G$) along the contour segment ($K_S$),
   determining a transformation state as a function of the fusion object data and the intersection point ($x_S$), wherein the transformation state comprises a lateral extent of the fusion object ($O_F$) with respect to the intersection point ($x_S$), an orientation of the fusion object ($O_F$) with respect to the reference coordinate system (R) of the vehicle, and an indicator characteristic value each which is representative of an uncertainty in the determination of the lateral extent and orientation,
   detecting a distance measurement value (d) of the distance sensor,
   assigning the distance measurement value (d) and the angle ($\alpha$) to the fusion object, and
   determining an innovated transformation state based on the transformation state, the indicator characteristic values, the distance measurement value (d) and the angle (a);
   determining an innovated fusion object based on the innovated transformation state to the fusion object data set, and controlling the vehicle in a longitudinal and/or lateral direction based on the innovated fusion object.

2. The method according to claim 1, wherein
   a distance characteristic value ($\hat{d}$) is determined depending on the fusion object data which is representative of a distance in the measurement direction (M) between the distance sensor and the fusion object ($O_F$) determined in the vicinity of the vehicle, and
   a deviation ($\varepsilon_d$) between the respective distance characteristic value ($\hat{d}$) and the distance measurement value (d) is determined, wherein only in the case that the deviation ($\varepsilon_d$) is smaller than a predetermined threshold value, are the distance measurement value (d) and the angle ($\alpha$) assigned to a fusion object ($O_F$).

3. The method according to claim 2, wherein
the fusion object data set comprises a plurality of fusion objects,
the distance measurement value (d) and the directional characteristic value are assigned exclusively to the fusion object ($O_F$) with the lowest determined deviation ($\varepsilon_d$).

4. The method according to claim 2, wherein
depending on the respective intersection point ($x_S$), the respective distance characteristic value ($\hat{d}$) is determined.

5. The method according to claim 4, wherein
the fusion object data comprises a fusion reference point ($A_F$), the lateral extent of the fusion object ($O_F$) with respect to the fusion reference point ($A_F$), the orientation of the fusion object ($O_F$) with respect to the reference coordinate system (R) of the vehicle, and the indicator characteristic value representative of an uncertainty in the determination of the lateral extent and orientation.

6. The method according to claim 1, wherein
the measuring direction (M) of the distance sensor is determined depending on a detection characteristic of the distance sensor.

7. A sensor data fusion device-configured to perform the method according to claim 1.

8. A vehicle comprising the sensor data fusion device according to claim 7 and the distance sensor as one of the plurality of sensors.

9. The vehicle according to claim 8, comprising a further sensor device of the plurality of sensors configured to:
detect measurement data representative of the vicinity of the vehicle,
determining-sensor object data which are representative of a sensor object ($O_S$) detected in the vicinity of the vehicle by the further sensor device, and
wherein the sensor data fusion device is further configured to determine the innovated fusion object ($O_F$) depending on the fusion object data set and the sensor object data.

10. The vehicle according to claim 9, wherein
the further sensor device comprises at least one of a camera, a RaDAR sensor, a LiDAR sensor, or a LaDAR sensor, or consists thereof.

11. The vehicle according to claim 8 wherein
the distance sensor comprises at least one of an ultrasonic sensor, a point laser sensor, an infrared sensor, or a RaDAR sensor, or consists thereof.

12. A non-transitory, computer-readable storage medium storing a computer program for sensor data fusion for a vehicle, the computer program comprising instructions which, when the computer program is executed by a computer, cause the same to execute the method of claim 1.

13. A vehicle comprising:
a sensor data fusion unit connected to a plurality of sensors,
a distance sensor as one of the plurality of sensors,
a driver assistance unit, and
a non-transitory, computer-readable storage medium storing a computer program for innovating a fusion object ($O_F$) representing an object in a vicinity of the vehicle, the sensor data fusion unit configured to execute the computer program to:
obtain a fusion object data set comprising the fusion object ($O_F$),
wherein the fusion object data set comprises fusion object data corresponding to the fusion object, and
wherein the fusion object is a fusion of a plurality of sensor objects each separately detected in the vicinity of the vehicle by one of the plurality of sensors,
determine an angle ($\alpha$) between a measurement direction (M) of the distance sensor and a predetermined reference axis (x) of a predetermined reference coordinate system (R) of the vehicle,
determine a contour segment ($K_S$) of the fusion object ($O_F$) facing the vehicle,
determine, using the distance sensor, an intersection point ($x_S$) between a vector in the measuring direction (M) and a straight line ($K_G$) along the contour segment ($K_S$),
determine a transformation state as a function of the fusion object data and the intersection point ($x_S$), wherein the transformation state comprises a lateral extent of the fusion object ($O_F$) with respect to the intersection point ($x_S$), an orientation of the fusion object ($O_F$) with respect to the reference coordinate system (R) of the vehicle, and an indicator characteristic value each which is representative of an uncertainty in the determination of the lateral extent and orientation,
detect a distance measurement value (d) of the distance sensor,
assign the distance measurement value (d) and the angle ($\alpha$) to the fusion object, determine an innovated transformation state based on the transformation state, the indicator characteristic values, the distance measurement value (d) and the angle ($\alpha$), and
determine an innovated fusion object based on the innovated transformation state,
wherein the driver assistance device controls the vehicle in a longitudinal and/or lateral direction based on the innovated fusion object.

14. The vehicle of claim 13 wherein the driver assistance unit is configured for at least one of active cruise control, intersection assistance, lateral collision avoidance, steering, and lane control assistance.

15. The vehicle of claim 13 wherein the distance sensor comprises at least one of an ultrasonic sensor, a point laser sensor, an infrared sensor, or a RaDAR sensor.

* * * * *